United States Patent
Carrell et al.

(10) Patent No.: US 10,176,582 B2
(45) Date of Patent: Jan. 8, 2019

(54) VIRTUAL FIDUCIAL MARKERS

(71) Applicant: Cydar Limited, Barrington (GB)

(72) Inventors: Tom Carrell, London (GB); Andreas Varnavas, London (GB); Graeme Penney, London (GB)

(73) Assignee: Cydar Limited, Cambridgeshire (GB)

( * ) Notice: Subject to any disclaimer, the term of this patent is extended or adjusted under 35 U.S.C. 154(b) by 0 days.

(21) Appl. No.: 14/401,801

(22) PCT Filed: May 10, 2013

(86) PCT No.: PCT/GB2013/000212
§ 371 (c)(1),
(2) Date: Nov. 17, 2014

(87) PCT Pub. No.: WO2013/171441
PCT Pub. Date: Nov. 21, 2013

(65) Prior Publication Data
US 2015/0138186 A1    May 21, 2015

(30) Foreign Application Priority Data
May 18, 2012 (GB) .................... 1208886.0

(51) Int. Cl.
*G06T 7/00* (2017.01)
*F24C 15/20* (2006.01)
*G06T 7/593* (2017.01)

(52) U.S. Cl.
CPC ........ *G06T 7/0075* (2013.01); *F24C 15/2021* (2013.01); *G06T 7/593* (2017.01);
(Continued)

(58) Field of Classification Search
CPC ....... F24C 15/2021; G06T 2207/10121; G06T 2207/30012; G06T 7/0075
See application file for complete search history.

(56) References Cited

U.S. PATENT DOCUMENTS

2003/0220555 A1    11/2003 Heigl et al.
2005/0085718 A1*   4/2005 Shahidi ................. A61B 1/04
                                                600/424
(Continued)

OTHER PUBLICATIONS

Daniel Ruijters, Drazenko Babic, Robert Homan, Peter Mielekamp, Bart M. ter Harr Romeny and Paul Suetens, "3D Multimodality Roadmapping in Neuroangiography," Medical Imaging 2007, Visualization and Image-Guided Procedures, edited by Kevin R. Cleary, Michael I. Miga, Proc. of SPIE vol. 6509, 65091F, (2007).*

(Continued)

*Primary Examiner* — Sing-Wai Wu
(74) *Attorney, Agent, or Firm* — Sterne, Kessler, Goldstein & Fox P.L.L.C.

(57) ABSTRACT

Embodiments of the invention introduce the concept of a virtual fiducial marker (VFM). This marker will not be placed prior to preoperative imaging. It will therefore not initially appear in the preoperative 3D image. Instead, the marker will be virtually placed in the 3D data set prior to surgery, and as such the marker does not even need to be attached to the patient, if the patient is not expected to move during surgery. The idea behind such a VFM comes from the observation that there is a big variation in the difficulty of an image based registration depending on the quality of the images and their field of view. However, provided two initial registrations to high quality wide field of view images can be carried out, it then becomes possible to use these registrations to insert a virtual fiducial marker within the 3D preoperative image. Once inserted it may then be used to obtain a starting position for a registration procedure, and particularly to obtain in-plane translations. It may also be used at the end of a registration to provide a measure of registration accuracy, to verify the registration and detect mis-registrations.

22 Claims, 10 Drawing Sheets

(52) U.S. Cl.
CPC ............... *G06T 2207/10121* (2013.01); *G06T 2207/30012* (2013.01)

(56) References Cited

U.S. PATENT DOCUMENTS

| | | | |
|---|---|---|---|
| 2009/0257551 A1 | 10/2009 | Dafni et al. | |
| 2009/0292201 A1* | 11/2009 | Kruecker | A61B 90/36 600/426 |
| 2012/0082360 A1* | 4/2012 | Florent | A61B 5/1076 382/132 |
| 2013/0060146 A1* | 3/2013 | Yang | A61B 90/30 600/476 |

OTHER PUBLICATIONS

Specification of Provisional U.S. Appl. No. 61/328,678 (filed Apr. 28, 2010) of US Patent Application: 2013/0060146.*
Russakoff, D.B., et al., Intensity-based 2D-3D spine image registration incorporating a single fiducial marker, Acad. Radiol. 12: 37-50 (Jan. 2005).
Anonymous, Triangulation (computer vision), Wikipedia, retrieved Jul. 19, 2013, from: http://en.wikipedia.org/w/index.php?title=Triangulation_%28computer_vision%29&oldid=460469006, (European Patent Office document No. XP002703957 dated Nov. 13, 2011, pp. 1-2.
Varnavas, A. et al., Increasing the automation of a 2D-3D registration system, IEEE Transactions on Med. Imaging, IEEE Service Ctr., Piscataway, NJ, USA, 32(2): 387-99 (Feb. 2013).
International Search Report and Written Opinion for PCT/GB2013/000212, dated Dec. 16, 2013.

\* cited by examiner

Fig 4: how intercept of lines 1 and 2 enable location of VFM within 3D image

Fig 9: workflow for use of VTM as registration verification

Figure 10

VIRTUAL FIDUCIAL MARKERS

This is a 371 National Stage entry of pending International Application No. PCT/GB2013/000212, filed May 10, 2013, which claims the benefit of GB 1208886.0, filed May 18, 2012, both of which are incorporated herein by reference in their entirety.

TECHNICAL FIELD

The present invention relates to a method and system for inserting virtual fiducial markers into three dimensional image data sets, and further to methods and systems that use such virtual fiducial markers for a variety of alignment or registration verification tasks. Embodiments of the invention find particular application in image-guided surgery, and particularly the registration of live 2D imagery with pre-obtained 3D image data.

BACKGROUND TO THE INVENTION AND PRIOR ART

Registration of preoperative 3D data to 2D intraoperative fluoroscopy data has been widely proposed for a number of clinical applications. Systems for radiosurgery and neurosurgery are in widespread clinical use. These systems allow overlay of preoperative data onto interventional images or allow additional information from a preoperative Computerised Tomography (CT) scan (e.g. a radiotherapy plan) to be accurately aligned to the patient.

In more detail, prior to an operation a patient is typically subjected to a CT scan of the body area where the surgery will take place. This results in a three-dimensional image of the scanned body area. However, during surgery real time 2D fluoroscopy images are obtained of the same area, using for example a C-arm type fluoroscopy machine. However, a 2D fluoroscopy image may be insufficient to allow a surgeon to determine the precise position within the body of surgical instruments or surgical implants, particularly during catheter based MIS procedures. For example, during stent-graft repair of aortic aneurysms, precise stent placement is essential.

Figure 1:
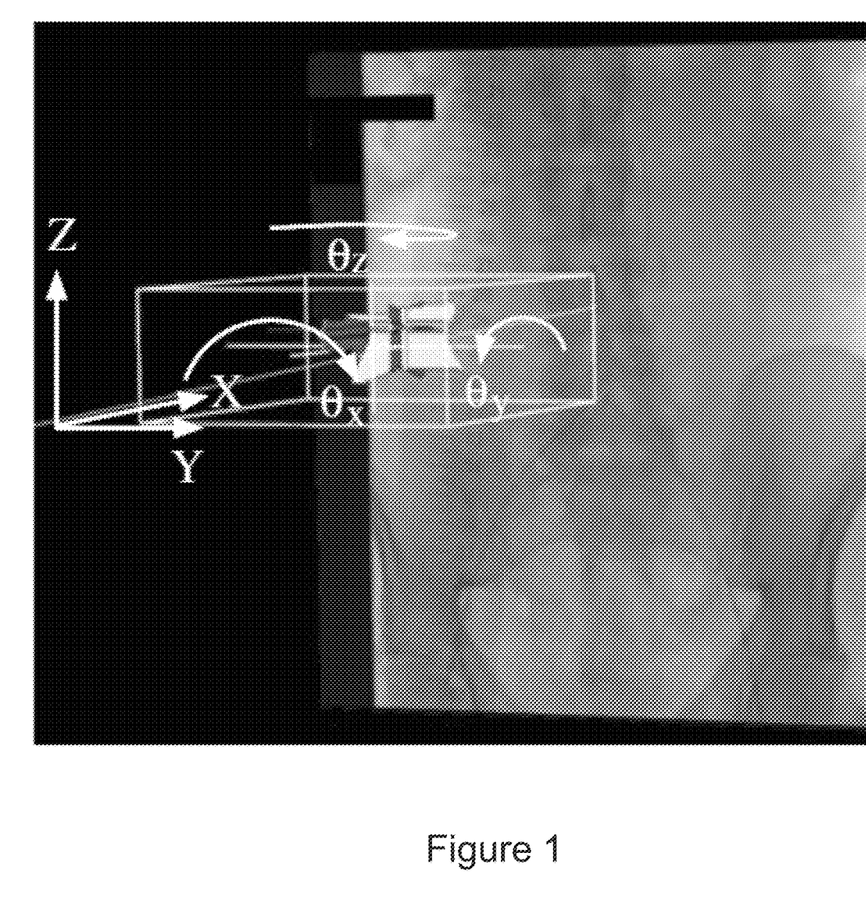
FIG. 1 is a diagram illustrating the orientation of 3D data.

In order to address the drawbacks of the 2D images, it is known to augment the 2D real time image with the 3D pre-obtained image, obtained, for example from a CT scan. The problem then arises of ensuring accurate registration of the 3D image with the 2D image i.e. ensuring that the 2D image is aligned with the correct parts of the 3D image. FIG. 1 illustrates that CT position and orientation is defined by six rigid body parameters, being three translations X, Y, and Z, and three rotations θx, θy, and θz. These can be divided into parameters which define movements parallel to the plane of the fluoroscopy image (in plane parameters θx, Y, and Z), and parameters which define movements a component of which is normal to the fluoroscopy plane (out-of-plane parameters θy, and θz, and X). The registration problem is then one of how to manipulate these parameters such that the 3D data volume becomes aligned with the 2D image such that the surgeon can have some confidence in the registration achieved.

Figure 3:
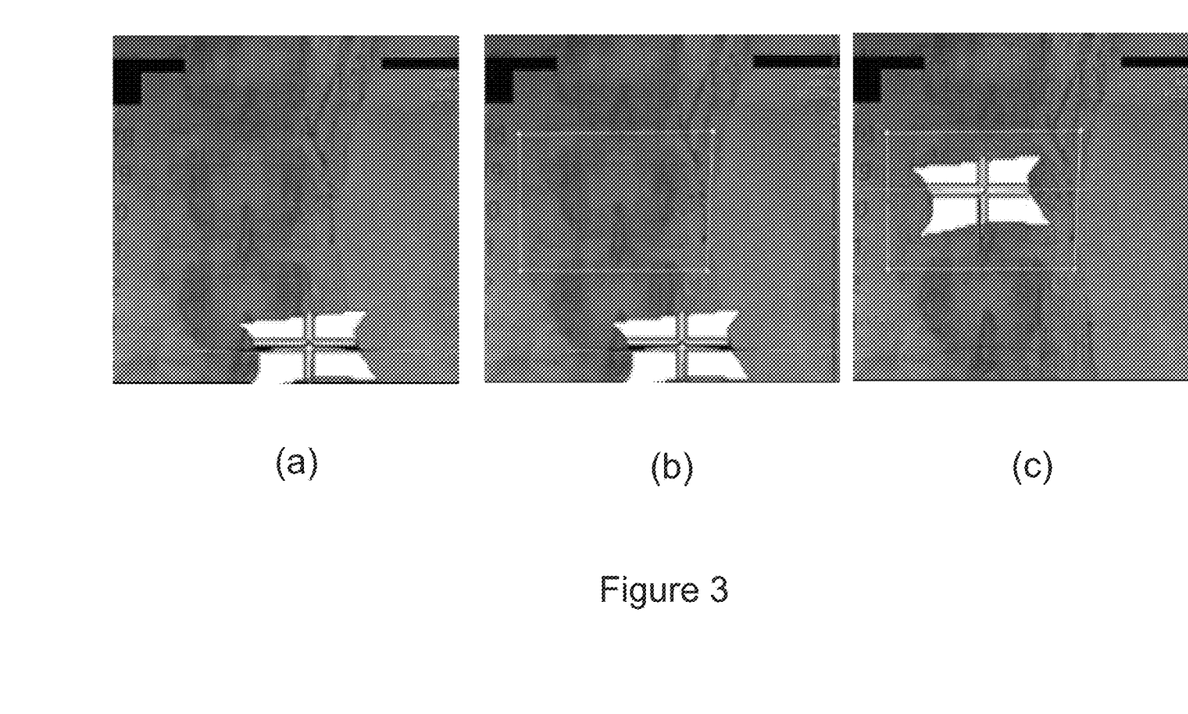
FIG. 3 is a series of diagrams illustrating a starting point procedure of the prior art.

Various registration techniques are known in the art. Specifically, in Penney et at "An Image-Guided Surgery System to Aid Endovascular Treatment of Complex Aortic Aneurysms: Description and Initial Clinical Experience", IPCAI 2011, LNCS 6689, pp. 13-24 the present inventors describe an intensity based registration technique which requires a starting position to be chosen by relying on visual inspection and identification of a vertebra in the fluoroscopy image. FIGS. 3(a) to (c) illustrate the procedure, where from an initial position (FIG. 3(a)) a region of interest is drawn (FIG. 3(b)) using a GUI, and the chosen 3D CT vertebra surface is then manually translated over the fluoroscopy vertebra (FIG. 3(c)).

Another technique is to use fiducial markers. Fiducial markers are frequently used as reference points to facilitate registration between an intraoperative image and a patient during surgery. The markers need to be attached prior to the pre-operative 3D imaging and then remain in place until surgery. This can be problematic if there is a large time period between imaging and surgery. In addition, the most accurate markers are bone implanted, which require an additional surgical procedure for their insertion. As such, fiducial markers are only usually used when absolutely necessary for the registration process, due to the significant additional costs and necessity of an additional surgical procedure. However, the use of fiducial markers can lead to good accuracy, and hence a system that provided the benefits of such markers but without the associated problems would be beneficial.

SUMMARY OF THE INVENTION

In order to address the above we introduce the concept of a virtual fiducial marker (VFM). This marker will not be placed prior to preoperative imaging. It will therefore not initially appear in the preoperative 3D image. Instead, the marker will be virtually placed in the 3D data set prior to surgery, and as such the marker does not even need to be attached to the patient, if the patient is not expected to move during surgery. The idea behind such a VFM comes from the observation that there is a big variation in the difficulty of performing an image based registration, depending on the quality of the images and their field of view.

However, provided two initial registrations to high quality wide field of view images can be carried out, it then becomes possible to use these registrations to insert a virtual fiducial marker within the 3D preoperative image. Once inserted it may then be used to obtain a starting position for a registration procedure, and particularly to obtain in-plane translations. It may also be used at the end of a registration to provide a measure of registration accuracy, to verify the registration and detect mis-registrations.

From one aspect, the present invention provides a method of inserting a virtual fiducial marker in a 3D image data set of a subject. The method comprises locating at least one fiducial marker in at least two 2D images of the subject, the 2D images having been obtained from different viewing angles. The 3D image data set is registered with the 2D images, and the location of a point within the 3D image data set is determined corresponding to the determined locations of the fiducial marker in the at least two 2D images. The 3D image data set is then marked accordingly so as to indicate a virtual fiducial marker at the determined point.

In one embodiment the location of a point is determined by calculating a first back-projected line from the location of the fiducial marker in a first image of the 2D images to a first position of an illumination source used to create the first 2D image and calculating a second back-projected line from the location of the fiducial marker in a second image of the 2D images to a second position of an illumination source used to create the second 2D image. A point of minimum distance between the first and second back-projected lines is then found, wherein the point of minimum distance is used as the location of the determined point.

In one embodiment the point of minimum distance is one of i) the point of intersection of the two or more back projected lines; or ii) in the case of there being no intersection, the mid-point of a line of minimum length drawn between the two or more back-projected lines.

In one embodiment the back-projected lines are calculated in dependence on respective perspective projection matrixes obtained from the registrations of the 3D image data set with the 2D images.

In one embodiment the fiducial marker is located in the 2D images using an automated feature recognition process.

In embodiments of the invention the fiducial marker is preferably a point feature with substantially the same appearance from the different viewing angles. More preferably the fiducial marker is radiopaque, and may be, for example, a ball bearing, or a ruler.

In one embodiment the different viewing angles are separated by at least 20 degrees.

In a second aspect there is provided a method of determining a start position for a 2D to 3D image registration. In this method at least one fiducial marker is located in a 2D image of a subject, and a back-projected line is calculated from the location of the fiducial marker in the 2D image to a first position of an illumination source used to create the 2D image. A 3D image data set of the subject is received, the 3D image data set having a virtual fiducial marker therein corresponding to the fiducial marker in the 2D image. The 3D image data set is translated such that the virtual fiducial marker is located on the back-projected line.

In one embodiment the method further comprises, estimating an initial pose for the 3D image data set, such that it substantially aligns with the pose of the subject.

In one embodiment the method further comprises estimating a perspective projection matrix based on an assumed subject position, the back-projected line being calculated in dependence on the estimated perspective projection matrix.

In one embodiment the translated 3D image data set is then used in a 2D to 3D image registration process, to register the 3D image to the 2D image.

In one embodiment the virtual marker is inserted into the 3D image data set using a method according to the first aspect.

A third aspect of the invention provides a method of verifying the accuracy of a 2D to 3D image registration process, wherein a 3D image data set containing at least one virtual fiducial marker has been registered (aligned) with a 2D image containing at least one fiducial marker corresponding to the virtual fiducial marker, the method comprising: i) calculating a back-projected line from the location of the fiducial marker in the 2D image to a first position of an illumination source used to create the 2D image; and ii) determining the minimum distance between the position of the virtual fiducial marker and the back-projected line.

In one embodiment the back-projected line is calculated using registration parameters from the image registration.

In one embodiment the method further comprises one or more of the following steps:
a) alerting the user that the determined minimum distance is greater than at least one predetermined threshold;
b) displaying the determined distance to the user; and/or
c) converting the distance into a probability of misregistration having occurred.

In one embodiment the virtual fiducial marker has been inserted into the image using the method of the first aspect above.

In one embodiment a start position for the image registration was found using the method of the second aspect above.

A further aspect of the invention provides an image guided surgical system, comprising:
    a 2D imaging system arranged in use to obtain at least two 2D images of a subject;
    at least one fiducial marker located in use within the field of view of the 2D imaging system; and
    a processor, arranged in use to:
    i) locate the fiducial marker in the at least two 2D images of the subject, the 2D images having been obtained from different viewing angles;
    ii) register a 3D image data set of the subject with the 2D images;
    iii) determine the location of a point within the 3D image data set corresponding to the determined locations of the fiducial marker in the at least two 2D images; and
    iv) mark the 3D image data set so as to indicate a virtual fiducial marker at the determined point.

A yet further aspect of the invention also provides an image guided surgical system, comprising:
    a 2D imaging system arranged in use to obtain one or more 2D images of a subject;
    at least one fiducial marker located in use within the field of view of the 2D imaging system; and
    a processor, arranged in use to:
    i) locate the at least one fiducial marker in a 2D image of the subject;
    ii) calculate a back-projected line from the location of the fiducial marker in the 2D image to a first position of an illumination source used to create the 2D image;
    iii) receive a 3D image data set of the subject, the 3D image data set having a virtual fiducial marker therein corresponding to the fiducial marker in the 2D image; and
    iv) translate the 3D image data set such that the virtual fiducial marker is located on the back-projected line;
    wherein the translated 3D image data set can then later be used as the starting data for a subsequent 2D to 3D image registration process Another aspect of the invention provides an image guided surgical system, comprising:
    a 2D imaging system arranged in use to obtain one or more 2D images of a subject;
    at least one fiducial marker located in use within the field of view of the 2D imaging system; and
    a processor, arranged in use to verify the accuracy of a 2D to 3D image registration process, wherein a 3D image data set containing a virtual fiducial marker has been registered (aligned) with a 2D image containing a fiducial marker corresponding to the virtual fiducial marker, the verification comprising:
    i) calculating a back-projected line from the location of the fiducial marker in the 2D image to a first position of an illumination source used to create the 2D image; and
    ii) determining the minimum distance between the position of the virtual fiducial marker and the back-projected line.

Another aspect of the invention includes computer program or suite of computer programs so arranged such that when executed by a computer they cause the computer to operate in accordance with the method of any of the above aspects. Also provided is a computer readable storage medium storing the computer program or at least one of the suite of computer programs.

Further aspects and features of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

Three embodiments of the invention will be described, each of which may be implemented within an image guided surgery system (IGSS) 26, such as that shown in FIG. 2.

Figure 2:
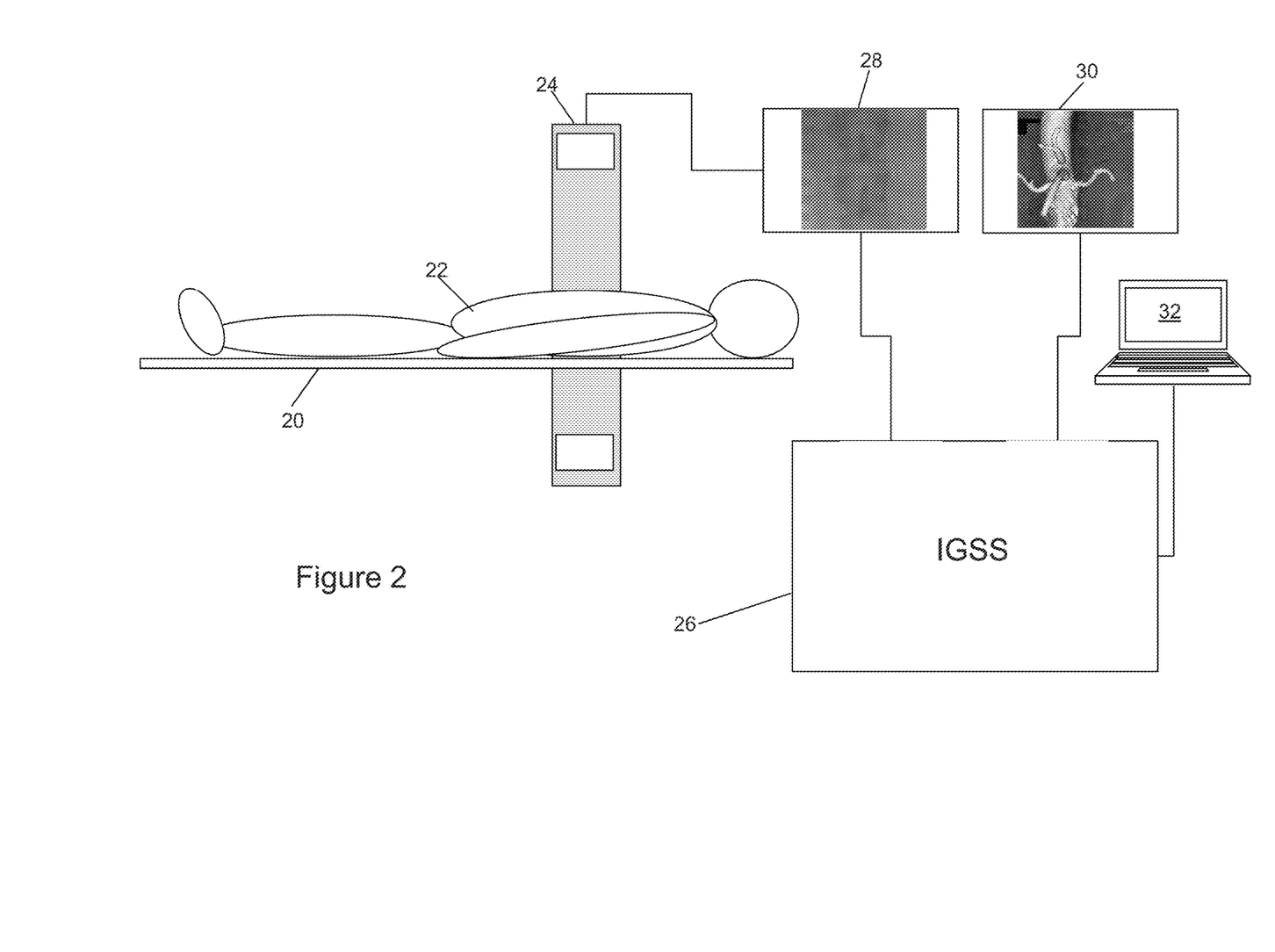
FIG. 2 is a block diagram of a typical surgical setup using a fluoroscopy machine.

FIG. 2 shows in schematic form a typical fluoroscopy set and table. Operating table 20 is provided with a C-arm 24 on opposite sides of which are an X-ray source and detector. The X-ray images from the C-arm are displayed on X-ray display 28. The patient lies on the table between the source and detector. A computer based image guided surgical system 26 receives the x-ray images on display 28 from the fluoroscopy set and generates the 2D fluoroscopy data augmented with aligned 3D image data, such as a CT scan, as shown on display 30. The IGSS 26 is controlled via user input device 32, such as a keyboard or the like.

The first embodiment acts to manipulate 3D image data so as to insert therein a virtual fiducial marker. This is achieved, as will be described in more detail below, by undertaking two registrations of the 3D data with two 2D images, the two 2D images having been captured of the subject from different angles. Within each 2D image there should be visible a common fiducial marker. This may, for example, be a feature of the subject shown in the images, such as, for example, a vertebra or the like in a surgical application, or may be a specific physical marker that has been inserted into the image. In one embodiment this marker is a radiopaque ruler placed under the patient subject, and visible in the fluoroscopy image. The registration of the 3D data set to a 2D image provides information in the form of a respective perspective projection matrix, which provides a transform to map the position of a 3D voxel in the 3D data set to a respective 2D image pixel position. Using this transform it becomes possible to calculate the equation of a 3D line from the 2D position of the fiducial marker in the 2D image to which the transform relates back to the position of the x-ray source which produced the image. By calculating such a 3D line for both 2D images using the respective transforms found for each, the 3D position of the fiducial marker within the 3D image space can be found, either at the intersection of the lines (ideally, if such intersection exists), or at the midpoint of a line which has the minimum distance between the two lines. A virtual fiducial marker (VFM) can then be inserted into the 3D data set, for example by inserting appropriate meta-data relating to the determined 3D position.

The second embodiment builds upon the VFM inserted by the first embodiment by using it to find a starting position for a subsequent registration between the 3D data set and a subsequent 2D image. Here, the fiducial marker visible in the 2D image is located in the image, and using an estimate of 3D image position a back-projection line is calculated. The 3D image data is then translated in a plane parallel to the 2D image until the VFM therein lies on the back-projection line. The resultant position of the translated 3D data image data is then used as a starting point for a subsequent 3D to 2D registration process, such as that described in Penney et al ibid.

The third embodiment provides an alternative use for an inserted VFM, being that of determining the accuracy of a registration process. In this respect, a registration process acts to orient the 3D data set via a series of translations and rotations, as described previously with respect to FIG. 1. Once a registration process has been performed, therefore, the set of 3D image data may have been translated, as well as slightly rotated from an initial start position. Where the 3D data set contains a VFM, however, corresponding to a fiducial marker still present in the 2D image, it becomes possible to determine the accuracy of the registration process by determining the distance between the VFM position, and the back-projection line from the 2D fiducial marker position to the X ray source. In a perfect registration, the VFM should lie on the back-projection line, and any deviation from such a condition indicates error in the registration achieved. By looking at the computed distance, therefore, it becomes possible to obtain information on whether the registration can be relied upon, or whether it needs to be performed again.

Figure 10:
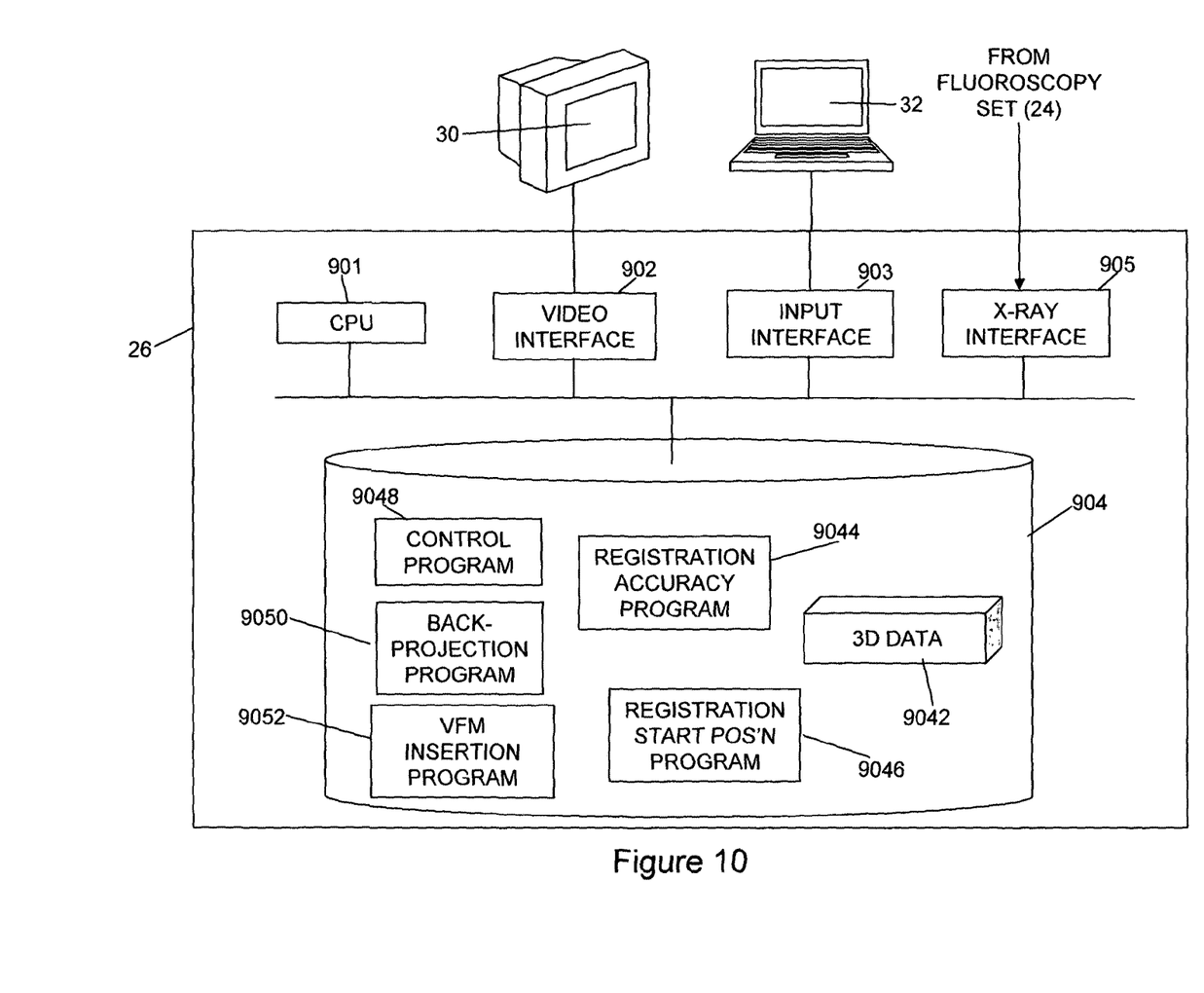
FIG. 10 is a diagram illustrating a computer system arranged to perform VFM insertion, registration, and registration verification in an embodiment of the invention.

As noted above, each of the three embodiments can be implemented in the image guided surgical system (IGSS) 26. FIG. 10 shows the IGSS in more detail, from which it can be seen that IGSS 26 may be provided by a general purpose computer system having an output display 30 and user input features such as a keyboard 32 to allow control thereof. The computer comprises CPU 901, video interface 902 to control the display 30, and input interface 903 to receive user input from keyboard (or other input device) 32. X-ray interface 905 receives 2D fluoroscopy image data from the fluoroscopy set 24. Also provided is data storage medium 904, such as hard disk, solid state storage, or the like, upon which control programs and other data may be stored.

The data storage medium 904 stores thereon a control program 9048, that retains overall control of the computer 26 during the following procedures described below. Also stored thereon is a back projection program 9050 that acts under the control of the control program to calculate back-projection lines, as will be described later. VFM insertion program 9052 is also stored, and which is used to insert VFM into 3D data sets, as also described later. The input to the VFM insertion program is 3D data 9042, obtained, for example, from a CT scan or the like. Registration accuracy program 9044 is also stored, which acts to determine the accuracy of a performed registration, using the VFM. Finally, registration start position program 9046 is stored, which acts to use the VFM to find an estimated start position for a registration process. The 2D image data received from the fluoroscopy set may also be stored on storage medium 904, if required.

It will of course be understood that IGSS 26 also comprises many other components and elements, whether hardware or software to enable its operation, but which are outside the scope of the present description, and which would be known to the person skilled in the art.

The first embodiment of the invention will now be described with respect to FIGS. 4 to 6. The first embodiment aims to insert a virtual fiducial marker into a pre-obtained 3D image data set, such as that obtained by a pre-operative CT or MRI scan.

Generally, the IGSS is controlled, via the control program 9048 to firstly perform registration of the 3D data to two (or more) 2D images, obtained from different angles. A common fiducial marker is found in each image, and a back-projection line from each located marker to the respective X-ray source position found, using the back-projection program 9050. Once the two (or more) back-projections are found, the VFM insertion program is used to insert a VFM into the 3D data set, at the intersection or point of closest passing of the two (or more) back projection lines.

Construction of a Back-Projection Line

Figure 4:
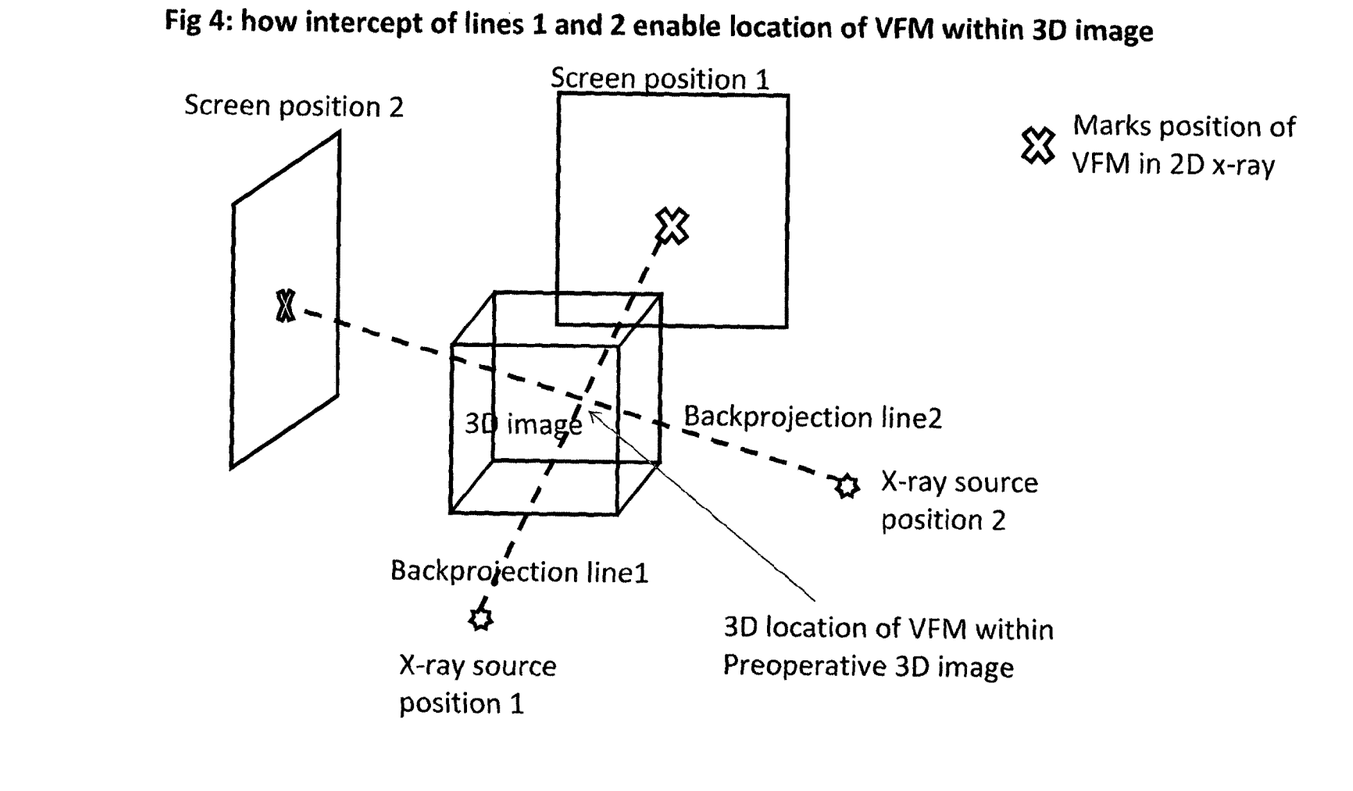
FIG. 4 is a diagram illustrating how back projection lines may locate a virtual fiducial marker in an embodiment of the present invention.
Figure 5:
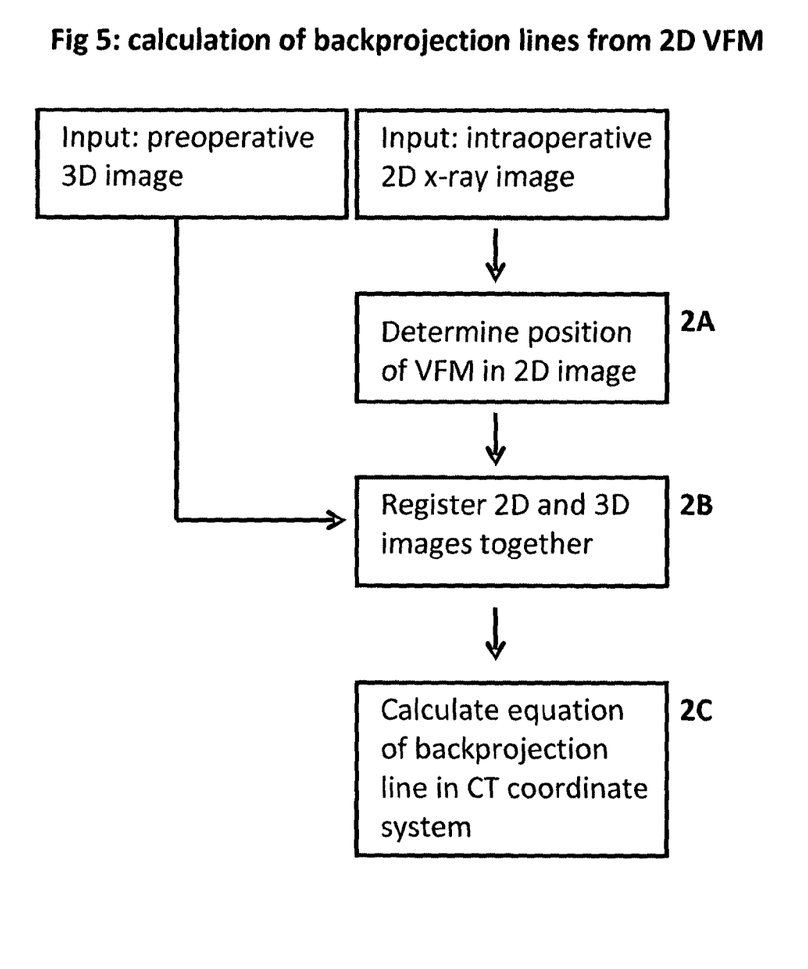
FIG. 5 is a flow diagram illustrating the calculation of back-projection lines in an embodiment of the invention.

FIG. 4 in conjunction with FIG. 5 will be used to explain how a back-projection line can be created by back-projection program 9050. As shown in FIG. 5 the inputs into the process are a single 2D image and the preoperative 3D image. A fiducial marker to form the basis of the VFM in the 3D image must be visible within the 2D image.

With reference to FIG. 5, step 2A calculates the 2D position of the visible fiducial marker within the 2D image. This could be achieved manually or by using a suitable feature extraction process e.g. a Hough transform. The marker may be a visible anatomical feature on the subject, such as a particular vertebra, or may be an object inserted into the field of view of the 2D image, such as a ruler, or other marker. In particular, a good fiducial marker is a point feature, which does not greatly alter appearance with respect to view direction and can be easily and accurately located (manually or automatically depending on method used) within the 2D image. It is also advantageous if the marker can be positioned close to the clinical area of interest.

Step 2B then carries out a 2D-3D image registration process to calculate the alignment between the CT scan and the 2D image. This could be achieved using an intensity-based 2D-3D registration algorithm, for example as described in Penney et al. ibid. The result of this process is to obtain a 3×4 perspective projection matrix P which maps a 3D position within the CT scan $(x, y, z, 1)^T$ to a 2D position in the fluoroscopy image $(u, v, 1)^T$: $P(x, y, z, 1)^T = \beta(u, v, 1)^T$, where $\beta$ is a scaling factor.

Below is an example 3×4 matrix P

[ 2.213560   0.104614   0.0000   −32.1076 ]

[ 0.048857   −0.277082   −2.1981   385.097 ]

[ 0.000190848   −0.00108235   0.0000   1.00000 ]

The calculation of a 2D-3D transformation matrix such as the projection matrix P is described in more detail in Medical Image Registration, CRC press, 2001, Eds Hajnal, Hill, Hawkes, and specifically at page 45, equations (3.9), (3.10) and (3.11), any details of which necessary for understanding the present invention being incorporated herein by reference.

Step 2C next uses the matrix P calculated in step 2B, and the 2D position of the VFM calculated from step 2A. The equation $P(x, y, z, 1)^T = \beta(u, v, 1)^T$ is rearranged as shown in Appendix 1 to form the equation of the 3D line that projects from the 2D VFM position back to the x-ray source. This line is parameterised in the CT coordinate system. Such a line is shown in FIG. 4, for fluoroscopy position 1 denoted as back-projection line 1.

Insertion of VFM into 3D Image

Figure 6:
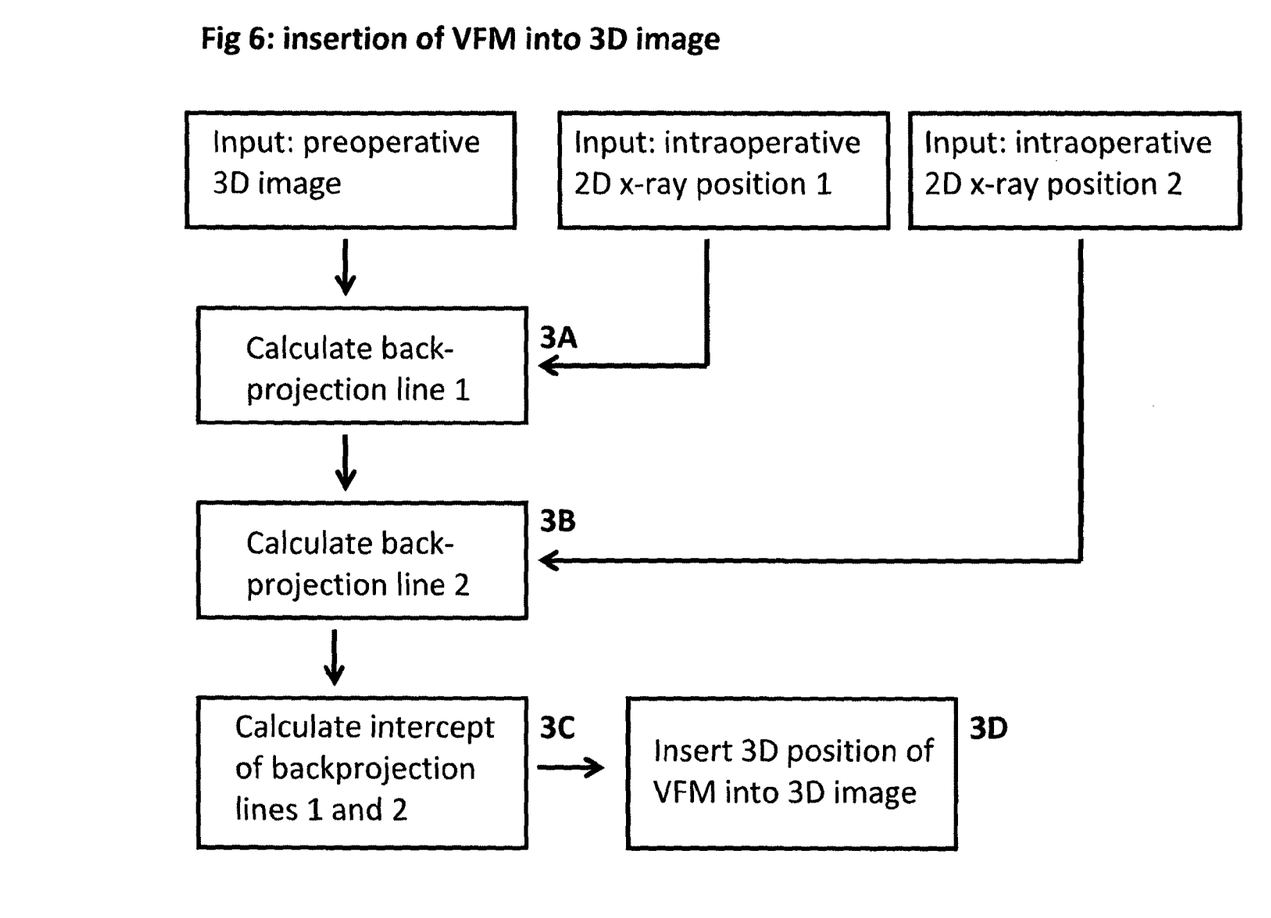
FIG. 6 is a flow diagram illustrating the insertion of a virtual fiducial marker (VFM) into a set of 3D image data used in an embodiment of the invention.

FIG. 4 in conjunction with FIG. 6 describe how the VFM is positioned within the 3D CT volume, by the VFM insertion program 9052.

With reference to FIG. 6, at step 3A VFM insertion program 9052 uses back projection program 9050 to construct back-projection line 1, using x-ray source and screen position 1, as shown in FIG. 4 and described above. At step 3B the fluoroscopy set is then rotated by an angle (20 degrees for example) to position the x-ray and screen in position 2, as shown in FIG. 4. A second x-ray image is acquired and back projection program 9050 is then used to calculate the equation of back-projection line 2. With respect to the angle between the different views, a sufficiently large angle should be used to allow good triangulation of the VFM position. Work on 3D guidewire reconstruction from biplane views in Shirley A. M. Baert, Graeme P. Penney, Theo van Walsum and Wiro J. Niessen *Precalibration Versus 2D-3D Registration for 3D Guide Wire Display in Endovascular Interventions*, MICCAI 2004, 577-584 shows that errors decrease rapidly as the difference between view angles increases from 0 to 20 degrees, and then a very gradual improvement occurs up to 90 degrees. Therefore in preferred embodiments of the invention we use view angle differences of at least 20 degrees.

Having acquired the information of the two back projection lines (specifically the 3D equations thereof parameterised in the CT co-ordinate system) at step 3C the VFM insertion program 9052 calculates either the intercept position between back-projection lines 1 and 2, or if they do not intersect the central position (mid-point) of a line which has the minimum length and connects backprojection lines 1 and 2 is calculated. This is the point at which a VFM is to be inserted. In terms of actual insertion, this comprises at step 3D the VFM insertion program 9050 adding VFM metadata to the 3D image data set, the meta-data containing the calculated position of the VFM in the CT coordinate system as calculated in step 3C.

At the end of the above process, therefore, a 3D data set is obtained that has been registered to two images in which a fiducial marker can be seen, and then the position of that fiducial marker as if it was located within the 3D data set is found, by a process of back-projection and triangulation. The 3D data set can then be updated with the located 3D position, with the result that a virtual fiducial marker corresponding to the actual fiducial marker visible on the 2D images is "inserted" into the 3D data set, at the correct 3D position therein.

Having inserted a 3D VFM into a 3D data set, the second and third embodiments provide several uses for such a VFM.

Use of VFM to Obtain Registration Starting Position

Figure 7:
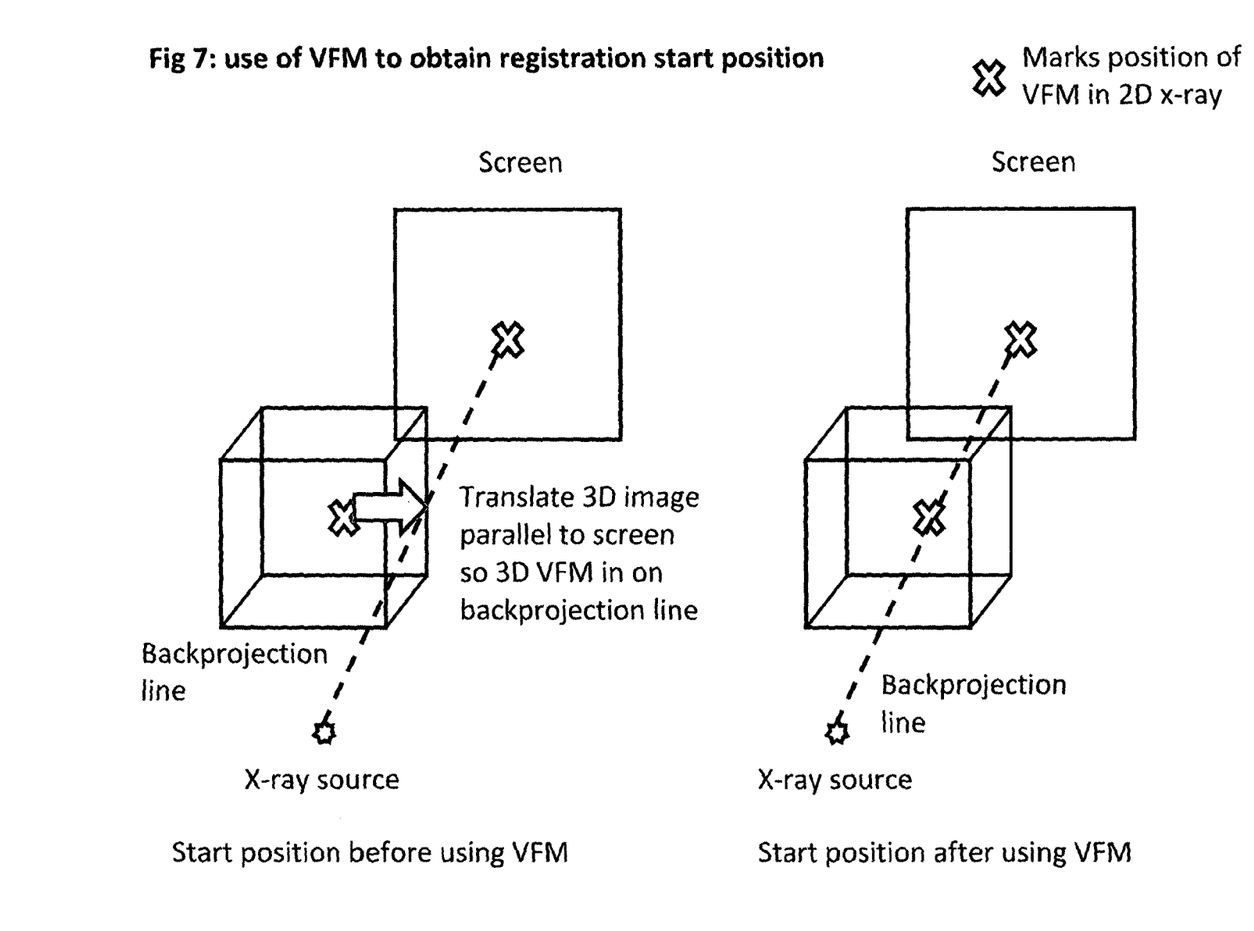
FIG. 7 is a diagram showing how a virtual fiducial marker may be used to obtain a registration start position in an embodiment of the invention.
Figure 8:
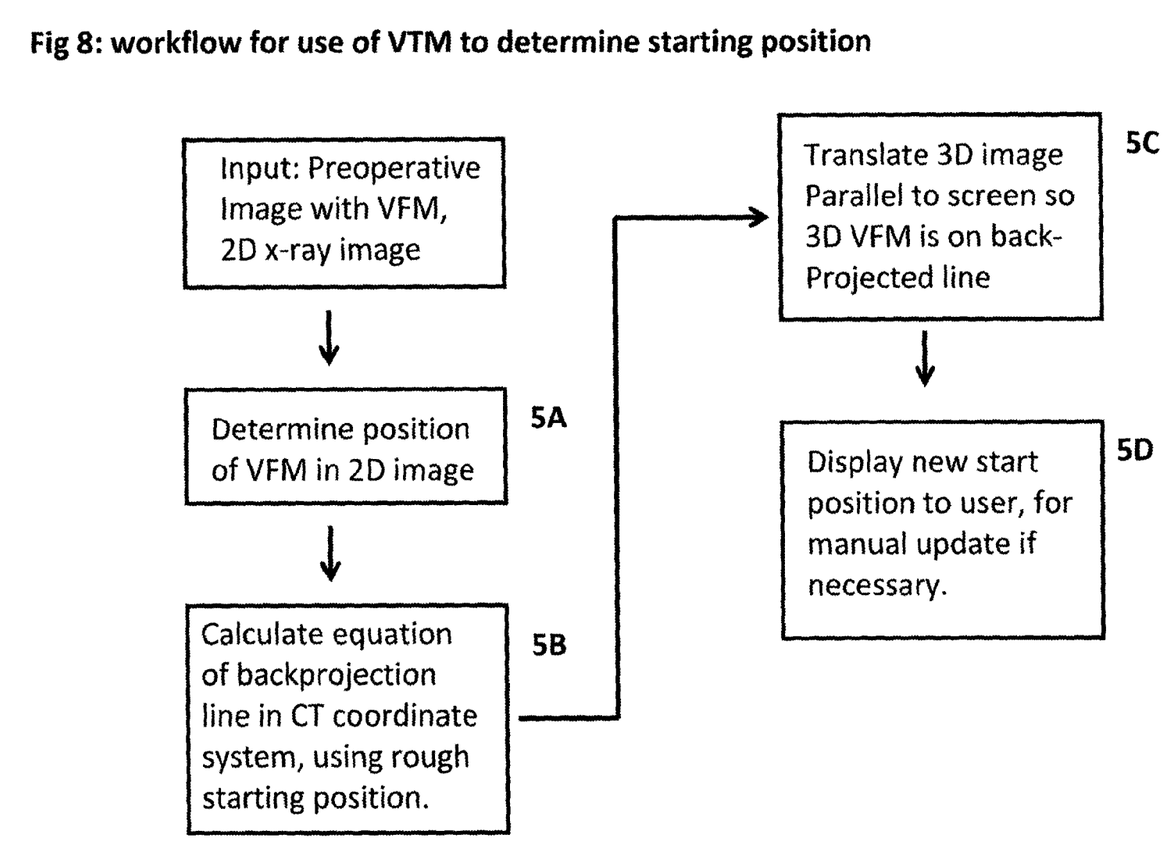
FIG. 8 is a flow diagram illustrating the steps involved in determining a registration start position using the VFM in embodiments of the invention.

The second embodiment uses an inserted VFM to obtain a starting position for a subsequent 3D to 2D image registration procedure. FIGS. 7 and 8 will now be used to explain how the VFM can be used to obtain a registration starting position. The required processing is generally performed by the registration start position program 9046, supplemented by manual inputs and controls as required.

With reference to FIG. 8, the inputs into the process are the 3D preoperative image, with the VFM inserted, and a 2D intra-operative image, which has the 2D FM (i.e. the actual 2D marker) visible. The aim is to use the VFM to obtain a starting position for an automatic registration algorithm (as shown in Penney et al. IPCAI 2011 ibid. for example).

In step 5A the 2D position of the 2D FM (i.e. the actual 2D marker, as noted above) is located within the 2D intra-operative image. This could be achieved manually, or using a suitable feature extraction method, such as a Hough transform for example.

In step 5B the equation of the back-projection line from the 2D VFM location is calculated, as shown in FIG. 4. The back-projection program 9050 is used. Note that an estimate of the projection matrix P is required in order to compute the back projection line. Formation of an estimated projection matrix $P_{est}$ requires an estimate for the six rigid body parameters illustrated in FIG. 1. These values are estimated as follows:
  i) the patient is assumed to lie 800 mm from the x-ray source (hence X=800),
  ii) the centre of the CT image is assumed to be aligned with the centre of the fluoroscopy image (and hence Y=Z=0),
  iii) the patient is assumed to be lying on their back in the same position as they were lying when the CT scan was taken so for an anterior-posterior fluoroscopy view (and hence \theta_x=0, \theta_y=0, \theta_z=90.)

For fluoroscopy views other than anterior-posterior the rotation parameters are altered using knowledge of how far the fluoroscopy set has moved from an anterior-posterior view, for example, for a left-anterior-oblique rotation of 20 degrees a value of \theta_z=70 would be used. These values provide a rough estimate of the registration parameters. They are accurate enough to produce an estimate, $P_{est}$, of the projection matrix to enable a useful starting position (i.e. one within the capture range of the automatic registration algorithm) to be found using the VFM.

Having obtained the back-projection line, at step 5C the 3D image data set is translated in a plane parallel to the 2D image plane so that the 3D VFM position is located on the back-projection line calculated in step 5B. This translation updates the rough estimate of the 3D image position used in step 5B to provide a more accurate starting estimate.

Step 5D is then optional, depending on the application. This step allows manual update of the found starting position using, for example, an overlay of observable anatomy for guidance.

With the above, therefore, the VFM is used to provide an initial starting estimate position for a registration procedure, which position should be accurate in terms of in-plane translation overlay of structures close to the VFM position. The registration algorithm then optimises a similarity measure to obtain accurate values for all the rigid body parameters.

Use of VFM for Registration Accuracy Verification

Figure 9:
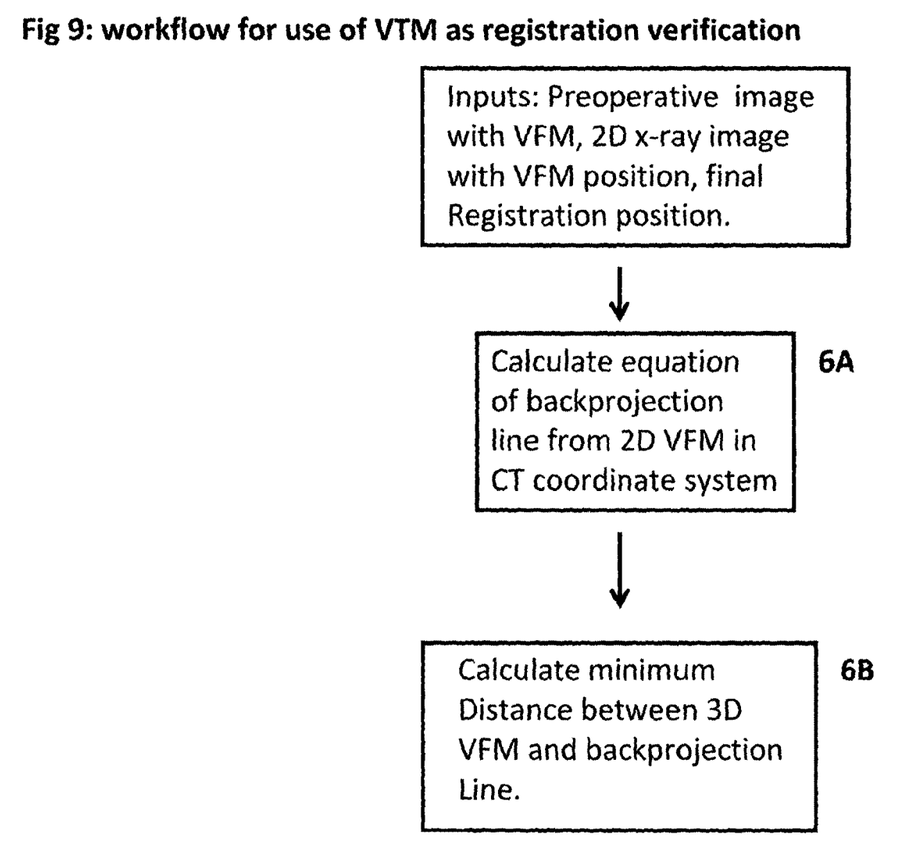
FIG. 9 is a flow diagram illustrating the steps involved in a process of registration verification using a VFM as provided by an embodiment of the invention.

The third embodiment uses the VFM to verify registration accuracy of a 2D to 3D image registration procedure that has already occurred. FIG. 9 shows the steps involved, which would generally be performed by the registration accuracy program 9044. The inputs are: 1. the preoperative image, with 3D position of VFM defined; 2. the 2D image with fiducial marker position (note that if the VFM was used to aid calculation of the starting position then the 2D FM position will already have been calculated as defined in step 5A above); and 3. the final registration parameters to be verified.

Firstly, step 6A calculates the equation of the back-projection line from the 2D VFM position using the final registration parameters. In this respect, the back-projection program 9050 may perform this task, as described previously with respect to FIGS. 4 and 5. Having obtained the back projection line, at step 6B the registration accuracy program 9044 calculates the minimum distance between the back-projected line and the 3D VFM position. Small values of this distance indicate an accurate registration. Large values can be used to detect either a mis-registration or patient movement. Ideally, the 3D VFM lies on the back-projected line, which would indicate a very accurate registration.

The calculated value may be displayed to the user, for the user to determine if the registration is accurate, based on the value. More preferable, however, is for the registration accuracy program to highlight a value which is of an amount indicating a mis-registration or movement, for example by comparing the calculated value with a predetermined threshold, and to alert the user if the threshold is exceeded. More than one such threshold may be included, to given different degrees of mis-registration.

With the above embodiments, therefore, the benefits of fiducial markers in terms of allowing for good accuracy may be obtained, but without the disadvantages of actual physical fiducial markers having to be implanted into or otherwise fastened onto the patient. Instead, by using insertion of a virtual marker into the 3D image data set then both accurate registration of 2D images to 3D images may be performed, as well as quantitative verification that a registration has been accurately made.

In the above described embodiments we describe inserting or using one VFM, but in other embodiments multiple VFMs may be inserted into the 3D data set, or used for start position estimation or registration verification. Use of more VFMs allows a better estimate of the starting position e.g. if two are used then in-plane rotation (\theta_x\) could also be accurately calculated. In addition plural VFMs makes the accuracy verification method of the third embodiment more accurate and powerful. The use of plural VFMS is particularly beneficial where identification of the actual fiducial markers in the 2D images is performed automatically, for example by image recognition techniques, as it then becomes possible to automatically pick out the plural actual fiducial markers in the 2D images, and then respectively insert corresponding virtual markers in the 3D data set, using the same techniques described above, but repeated plural times for each VFM to be inserted. Likewise, in the start position estimation and registration verification embodiments, having more VFMs to work with increases the amount of information in the system, and hence can lead to more accurate results, in the form of a more accurate start position, or a more accurate registration verification.

Various modifications, whether by way of addition, deletion or substitution may be made to the above described embodiment to provide further embodiments, any and all of which are intended to be encompassed by the appended claims.

APPENDIX 1

Conversion of Perspective Projection Matrix to Line Equation

Perspective projection matrix P (of size 3×4) relates positions in 3D coordinate system $(x, y, z, 1)^T$ to positions in 2D coordinate system $(u, v, 1)^T$ (note use of homogeneous coordinates in both 2D and 3D), $\beta$ is the scaling factor.

$$P \begin{pmatrix} x \\ y \\ z \\ 1 \end{pmatrix} = \beta \begin{pmatrix} u \\ v \\ 1 \end{pmatrix} \quad (1)$$

Given a 3D point position $(x, y, z, 1)^T$ it is trivial to multiply through equation (1) to obtain the corresponding 2D position $(u, v, 1)^T$.

Given a 2D point position $(u, v, 1)^T$ it is possible to obtain the equation of a line within the 3D coordinate system. This document explains how to calculate the equation of this 3D line.

Writing P as:

$$\begin{pmatrix} p_{11} & p_{12} & p_{13} & p_{14} \\ p_{21} & p_{22} & p_{23} & p_{24} \\ p_{31} & p_{32} & p_{33} & p_{34} \end{pmatrix} \quad (2)$$

We can multiply out equation (1) to obtain the following three equations:

$p_{11}x + p_{12}y + p_{13}z + p_{14} = \beta u$ $p_{21}x + p_{22}y + p_{23}z + p_{24} = \beta v$ $p_{31}x + p_{32}y + p_{33}z + p_{34} = \beta \quad (3)$ Substitute the value of $\beta$ from the bottom equation into the top two. This leaves two equations with three unknowns x, y, z (NB u, v are known as we are given the 2D position and wish to calculate the equation of the 3D line).

$p_{11}x + p_{12}y + p_{13}z + p_{14} = u(p_{31}x + p_{32}y + p_{33}z + p_{34})$ $p_{21}x + p_{22}y + p_{23}z + p_{24} = u(p_{31}x + p_{32}y + p_{33}z + p_{34}) \quad (4)$ Use the two simultaneous equations to remove one of the unknown, for example, make x the subject of the above two equations:

$$x = \frac{y(up_{32} - p_{12}) + z(up_{33} - p_{13}) + up_{34} - p_{14}}{p_{11} - up_{31}} \quad (5)$$

$$y = \frac{y(vp_{32} - p_{22}) + z(vp_{33} - p_{23}) + vp_{34} - p_{24}}{p_{21} - vp_{31}}$$

Equate and rearrange:

$(p_{21} - vp_{31})(y(up_{32} - p_{12}) + z(up_{33} - p_{13}) + up_{34} - p_{14}) = (p_{11} - up_{31})(y(vp_{32} - p_{22}) + z(vp_{33} - p_{23}) + vp_{34} - p_{24}) \quad (6)$ To simplify, set the known constants:

$A = p_{21} - vp_{31}$ $B = up_{34} - p_{14}$ $C = p_{11} - up_{31}$ $D = vp_{34} - p_{24}$ $A(y(up_{32} - p_{12}) + z(up_{33} - p_{13}) + B) = C(y(vp_{32} - p_{22}) + z(vp_{33} - p_{23}) + D) \quad (7)$ Rearrange to get:

$$y = \frac{z(C(vp_{33} - p_{23}) - A(up_{33} - p_{13})) + CD - AB}{A(up_{32} - p_{12}) - C(vp_{32} - p_{22})} \quad (8)$$

To simplify, set the known constants:

$$E = \frac{C(vp_{33} - p_{23}) - A(up_{33} - p_{13})}{A(up_{32} - p_{12}) - C(vp_{32} - p_{22})}$$

$$F = \frac{CD - AB}{A(up_{32} - p_{12}) - C(vp_{32} - p_{22})}$$

To give the equation of the line between y and z:

$y = Ez + F \quad (9)$

By substituting this back into equation (5) the linear relationship between x and z can be obtained.

By rearranging equation (9) to make z the subject and substituting back into equation (5) the linear relationship between x and y can be obtained.

The invention claimed is:

1. A method of inserting a virtual fiducial marker in a 3D image data set of a subject and using the virtual fiducial marker to find the starting position for a subsequent 2D to 3D image registration, the method comprising:
   i) locating at least one fiducial marker in at least two intraoperative 2D images of the subject, the 2D images having been obtained from different viewing angles;
   ii) registering a preoperative 3D image data set with the intraoperative 2D images;
   iii) determining the location of a point within the 3D image data set corresponding to the determined locations of the fiducial marker in the at least two 2D images;
   iv) marking the 3D image data set so as to indicate a virtual fiducial marker at the determined point;
   v) obtaining a single additional intraoperative 2D image; and
   vi) using the virtual fiducial marker of (iv) to find the starting position for a 2D to 3D image registration process whereby the single additional intraoperative 2D image of (v) is registered with the preoperative 3D image data set.

2. A method according to claim 1, wherein the determining the location of a point comprises:
   a) calculating a first back-projected line from the location of the fiducial marker in a first image of the 2D images to a first position of an illumination source used to create the first 2D image;
   b) calculating a second back-projected line from the location of the fiducial marker in a second image of the 2D images to a second position of an illumination source used to create the second 2D image; and
   c) determining a point of minimum distance between the first and second back-projected lines;
   wherein the point of minimum distance is used as the location of the determined point.

3. A method according to claim 2, wherein the point of minimum distance is one of:
   i) the point of intersection of the two or more back projected lines; or
   ii) in the case of there being no intersection, the mid-point of a line of minimum length drawn between the two or more back-projected lines.

4. A method according to claim 2 wherein the back-projected lines are calculated in dependence on respective perspective projection matrixes obtained from the registrations of the 3D image data set with the 2D images.

5. A method according to claim 1, wherein the fiducial marker is located in the 2D images using an automated feature recognition process.

6. A method according to claim 1, wherein the fiducial marker is a point feature with substantially the same appearance from the different viewing angles.

7. A method according to claim 1, wherein the fiducial marker is radiopaque and optionally comprises a ball bearing or a ruler.

8. A method according to claim 1, wherein the different viewing angles are separated by at least 20 degrees.

9. The method of claim 1, wherein using the virtual fiducial marker to find the starting position for a subsequent 2D to 3D image registration process comprises:
   i) locating at least one fiducial marker in a 2D image of a subject;
   ii) calculating a back-projected line from the location of the fiducial marker in the 2D image to a first position of an illumination source used to create the 2D image;
   iii) receiving a 3D image data set of the subject, the 3D image data set having the virtual fiducial marker therein corresponding to the fiducial marker in the 2D image; and
   iv) translating the 3D image data set such that the virtual fiducial marker is located on the back-projected line.

10. A method according to claim 9, wherein the method further comprises, estimating an initial pose for the 3D image data set, such that it substantially aligns with the pose of the subject.

11. A method according to claim 9, wherein the method further comprises estimating a perspective projection matrix based on an assumed subject position, the back-projected line being calculated in dependence on the estimated perspective projection matrix.

12. A method according to claim 9, wherein the translated 3D image data set is then used in a 2D to 3D image registration process, to register the 3D image to the 2D image.

13. A method according to claim 9, wherein the virtual fiducial marker is inserted into the 3D image data set using a method comprising:
   i) locating at least one fiducial marker in at least two 2D images of the subject, the 2D images having been obtained from different viewing angles;
   ii) registering the 3D image data set with the 2D images;
   iii) determining the location of a point within the 3D image data set corresponding to the determined locations of the fiducial marker in the at least two 2D images; and
   iv) marking the 3D image data set so as to indicate a virtual fiducial marker at the determined point.

14. The method of claim 1, wherein the subsequent 2D to 3D image registration process of part (v) registers a single 2D image containing a fiducial marker with the 3D image containing the virtual fiducial marker.

15. The method of claim 1, wherein one fiducial marker is located in the at least two intraoperative 2D images of the subject in part (i).

16. The method of claim 1, wherein the preoperative 3D image data are derived from a computerized tomography (CT) scan and the at least two intraoperative 2D images are fluoroscopy or X-ray images.

17. An image guided surgical system, comprising:
   a 2D imaging system arranged in use to obtain:
   a first group of at least two intraoperative 2D images of a subject; at least one fiducial marker located in use within the field of view of the 2D imaging system; and
   a single additional intraoperative 2D image of a subject; at least one fiducial marker located in use within the field of view of the 2D imaging system;
   and
   a processor, arranged in use to:
   i) locate the fiducial marker in the first group of at least two intraoperative 2D images of the subject, the 2D images having been obtained from different viewing angles;
   ii) register a preoperative 3D image data set of the subject with the first group of 2D images;
   iii) determine the location of a point within the preoperative 3D image data set corresponding to the determined locations of the fiducial marker in the first group of at least two intraoperative 2D images;
   iv) mark the 3D image data set so as to indicate a virtual fiducial marker at the determined point; and
   v) use the virtual fiducial marker to find the starting position for a subsequent 2D to 3D image registration process; wherein the single additional intraoperative 2D image is registered with the preoperative 3D image data set.

18. An image guided surgical system according to claim 17, wherein the processor is further arranged to perform a method comprising:
   a) calculating a first back-projected line from the location of the fiducial marker in a first image of the 2D images to a first position of an illumination source used to create the first 2D image;
   b) calculating a second back-projected line from the location of the fiducial marker in a second image of the 2D images to a second position of an illumination source used to create the second 2D image; and
   c) determining a point of minimum distance between the first and second back-projected lines;
   wherein the point of minimum distance is used as the location of the determined point.

19. An image guided surgical system according to claim 17, wherein the fiducial marker is a point feature with substantially the same appearance from the different viewing angles.

20. An image guided surgical system according to claim 17, wherein the fiducial marker is radiopaque and optionally comprises ball bearing or a ruler.

21. An image guided surgical system, comprising:
   a 2D imaging system arranged in use to obtain a single intraoperative 2D image of a subject;
   at least one fiducial marker located in use within the field of view of the 2D imaging system; and
   a processor, arranged in use to:
   i) locate the at least one fiducial marker in an intraoperative 2D image of the subject;
   ii) calculate a back-projected line from the location of the fiducial marker in the 2D image to a first position of an illumination source used to create the 2D image;
   iii) receive a preoperative 3D image data set of the subject, the 3D image data set having a virtual fiducial marker therein corresponding to the fiducial marker in the 2D image; and
   iv) translate the 3D image data set such that the virtual fiducial marker is located on the back-projected line;

wherein the translated 3D image data set can be used to find the starting position for a subsequent 2D to 3D image registration process.

22. A system according to claim 21, wherein the processor is further arranged to insert a virtual fiducial marker into the 3D image data set using a method comprising:
   i) locating at least one fiducial marker in at least two intraoperative 2D images of the subject, the 2D images having been obtained from different viewing angles;
   ii) registering the 3D image data set with the 2D images;
   iii) determining the location of a point within the 3D image data set corresponding to the determined locations of the fiducial marker in the at least two 2D images; and
   iv) marking the 3D image data set so as to indicate a virtual fiducial marker at the point determined point.

* * * * *